(12) United States Patent
Rapp et al.

(10) Patent No.: US 12,309,176 B2
(45) Date of Patent: May 20, 2025

(54) MESSAGE COMPLIANCE SCANNING AND PROCESSING SYSTEM

(71) Applicant: Proofpoint, Inc., Sunnyvale, CA (US)

(72) Inventors: Daniel Wallace Rapp, Highland, UT (US); Michael Paul Jones, Highland, UT (US); Brian Sanford Jones, Cary, NC (US); Andre Turgeon, Cedar Hills, UT (US); Xinzi Wu, Sandy, UT (US); Alan Wessman, Spanish Fork, UT (US)

(73) Assignee: Proofpoint, Inc., Sunnyvale, CA (US)

( * ) Notice: Subject to any disclaimer, the term of this patent is extended or adjusted under 35 U.S.C. 154(b) by 227 days.

(21) Appl. No.: 18/101,223

(22) Filed: Jan. 25, 2023

(65) Prior Publication Data

US 2023/0247033 A1  Aug. 3, 2023

Related U.S. Application Data

(60) Provisional application No. 63/304,947, filed on Jan. 31, 2022.

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,630,631 | B1 * | 4/2020 | Yague | H04L 51/212 |
| 2012/0191792 | A1 * | 7/2012 | Chebiyyam | H04L 51/42 |
| | | | | 709/206 |
| 2020/0090644 | A1 * | 3/2020 | Klingler | G10L 25/51 |
| 2021/0097605 | A1 * | 4/2021 | Yeri | G06F 16/3346 |
| 2021/0344710 | A1 * | 11/2021 | Kras | G09B 19/00 |
| 2023/0177581 | A1 * | 6/2023 | Ren | G06Q 30/0282 |
| | | | | 705/26.7 |

FOREIGN PATENT DOCUMENTS

WO  WO-2008100571 A1 *  8/2008  ............. G06Q 10/10

OTHER PUBLICATIONS

Gunikhan Sonowa—"Phishing Email Detection Based on Binary Search Feature Selection"—2020 (Year: 2020).*

* cited by examiner

*Primary Examiner* — Younes Naji
(74) *Attorney, Agent, or Firm* — Banner & Witcoff, Ltd.

(57) ABSTRACT

Aspects of the disclosure relate to message compliance analysis. A computing platform accesses historical messages. The computing platform pre-processes the historical messages to configure the historical messages for use in training a disclaimer model to identify whether or not input messages include a disclaimer. The computing platform trains, using the pre-processed historical messages, the disclaimer model. The computing platform receives a new message. The computing platform inputs, into the disclaimer model, the new message, which produces a disclaimer score indicating a likelihood that the new message includes a disclaimer. The computing platform compares the disclaimer score to a disclaimer threshold. Based on identifying that the disclaimer score meets or exceeds the disclaimer threshold, the computing platform removes, from a set of messages scheduled for compliance review, the new message, and sends, to an intended recipient of the new message, the new message.

17 Claims, 7 Drawing Sheets

MESSAGE COMPLIANCE SCANNING AND PROCESSING SYSTEM

CROSS-REFERENCE TO RELATED APPLICATIONS

This application claims the benefit of and priority to U.S. Provisional Patent Application Ser. No. 63/304,947, filed Jan. 31, 2022, and entitled "Message Compliance Scanning and Processing System," which is incorporated by reference herein in its entirety.

TECHNICAL FIELD

Aspects of the disclosure relate to message compliance scanning and processing systems, machine learning systems, and communication systems and networks. In particular, one or more aspects of the disclosure relate to identifying electronic messages, using machine learning, that may be excluded from further message compliance scanning and/or review.

BACKGROUND

Increasingly, organizations face various cybersecurity threats through electronic communications. Various methods of message analysis have been developed to combat these threats. It remains difficult, however, for message recipients to distinguish between trusted and malicious email communications. Accordingly, it may be important to review electronic communications for compliance before routing them to their intended recipients. Attempts to integrate such analysis techniques into efficient and effective automated processes present additional technical challenges, however, particularly when trying to balance and optimize efficiency and time constraints against the consumption of the computing resources, such as processing power, which may be used in analysis of a large number of electronic messages.

SUMMARY

Aspects of the disclosure provide technical solutions that overcome one or more of the technical problems described above and/or other technical challenges. For instance, one or more aspects of the disclosure relate to message compliance scanning. In accordance with one or more embodiments, a computing platform having at least one processor, a communication interface, and memory may access historical messages. The computing platform may pre-process the historical messages to configure the historical messages for use in training a disclaimer model to identify whether or not input messages include a disclaimer. The computing platform may train, using the pre-processed historical messages, the disclaimer model. The computing platform may receive a new message. The computing platform may input, into the disclaimer model, the new message, which may produce a disclaimer output indicating whether or not the new message includes a disclaimer. Based on identifying that the new message does include a disclaimer, the computing platform may remove, from a set of messages scheduled for compliance review, the new message, and send, to an intended recipient of the new message, the new message.

In one or more instances, the pre-processing may include: 1) extracting, from the historical messages, plain text; 2) separating the plain text into paragraphs; 3) receiving message label information indicating whether or not each of the paragraphs include a disclaimer; 4) labeling the paragraphs based on the message label information; and 5) converting the paragraphs into numeric representations configured for input into the disclaimer model.

In one or more examples, the disclaimer model may be a text classification model. In one or more examples, producing the disclaimer output may include producing a disclaimer score indicating a likelihood that the new message includes a disclaimer. In these examples, the disclaimer score may indicate a value between zero and one, where a disclaimer score of zero indicates that the new message definitely does not include a disclaimer, and a disclaimer score of one indicates that the new message definitely includes a disclaimer. The computing platform may compare the disclaimer score to a disclaimer threshold, where identifying that the new message does include a disclaimer is based on identifying that the disclaimer score meets or exceeds the disclaimer threshold.

In one or more instances, based on identifying that the new message does not include a disclaimer, the computing platform may route the new message for one or more of: automated or manual message compliance review. In one or more instances, training the disclaimer model may include: 1) receiving a target level of accuracy for the disclaimer model, which may include one or more of: a target level of recall or a target level of precision; 2) identifying a level of accuracy for the disclaimer model; 3) comparing the level of accuracy to the target level of accuracy; 4) based on identifying that the level of accuracy is equal to or greater than the target level of accuracy, deploying the disclaimer model; and 5) based on identifying that the level of accuracy is less than the target level of accuracy, continuing to train the disclaimer model.

In one or more examples, the computing platform may train, using the pre-processed historical messages, a low risk content model, where the low risk content model may be configured to identify a likelihood that the input messages comprise one of: a newsletter, an automated notification, or a different message. In one or more examples, the computing platform may input, into the low risk content model, the new message, where the low risk content model may produce: a newsletter score indicating a likelihood that the new message is a newsletter, an automated notification score indicating a likelihood that the new message is an automated notification, and an other message score indicating a likelihood that the new message is another type of message, where a sum of the newsletter score, the automated notification score, and the other message score may be one.

In one or more instances, the computing platform may compare each of the newsletter score, the automated notification score, and the other message score to a content threshold. Based on identifying that the newsletter score or the automated notification score meets or exceeds the content threshold, the computing platform may remove, from a set of messages scheduled for compliance review, the new message, and send, to an intended recipient of the new message, the new message. Based on identifying that the other message score meets or exceeds the content threshold, the computing platform may route the new message for one or more of: automated or manual message compliance review.

In one or more examples, the content threshold may be specified at a user device via selection on a graphical user interface that includes a relationship between accuracy and filtering efficacy of the low risk content model as the content threshold is adjusted. In one or more examples, the computing platform may audit the low risk content model to verify that accuracy of the low risk content model meets or exceeds an accuracy threshold, which may include: 1) withholding a subset of the pre-processed historical messages from use in training the low risk content model; and 2) upon identifying that the low risk content model should be audited: a) inputting the subset of the pre-processed historical messages into the low risk content model, b) routing the subset of the pre-processed historical messages for manual review, c) comparing results of the low risk content model analysis and the manual review, d) based on identifying that the comparison indicates accuracy that meets or exceeds the accuracy threshold, continuing to operate the low risk content model, and e) based on identifying that the comparison indicates the accuracy does not meet or exceed the accuracy threshold, continuing to train the low risk content model.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

One or more arrangements described herein address problems associated with identification of message compliance scanning and processing. Aspects described are generally related to systems and methods for addressing and analyzing messages flagged as potentially violating one or more compliance rules. More specifically, this concept involves systems and methods for processing flagged message data using one or more machine learning models. For example, message data that has been flagged as potentially violating one or more compliance rules may be further analyzed by one or more machine learning models to determine whether the flagged message data is not problematic (and therefore not requiring escalation and/or further manual review) or questionable enough to warrant such escalation and/or further manual review. This may address a significant need among customer organizations, particularly those in highly regulated industries, as these organizations must otherwise rely on labor-intensive and costly manual review processes to analyze messages that are flagged as posing potential compliance violations.

Unlike conventional approaches to message analysis, this approach goes beyond relying only on simple rules (e.g., regular expressions) and instead may incorporate machine learning models that score messages so that the messages can be sorted into a first group of messages for which further analysis should be performed, and a second group for which no additional action may be needed (e.g., because the messages are identified as non-problematic).

More specifically, the inclusion of disclaimer text in messages may lead to false positives as compliance violations. For example, this text may be boilerplate language that intends to limit a scope of rights and/or obligations that may be exercised or enforced against a party corresponding to the disclaimer. In many instances, this disclaimer text may include words, phrases, and/or other information that may trigger compliance violations. However, due to the nature of the messages including the disclaimers, they may be known compliant messages. Nevertheless, because the language triggers compliance violations, messages that include disclaimers may be flagged for further compliance review, which may, e.g., consume additional computing and/or manual review resources, and/or may cause processing delays. Accordingly, as described herein, disclaimer messages may be automatically identified and removed from further compliance analysis, so as to reduce processing inefficiencies and/or delays.

These and other methods are described further in more detail in the following description.

Figure 1:
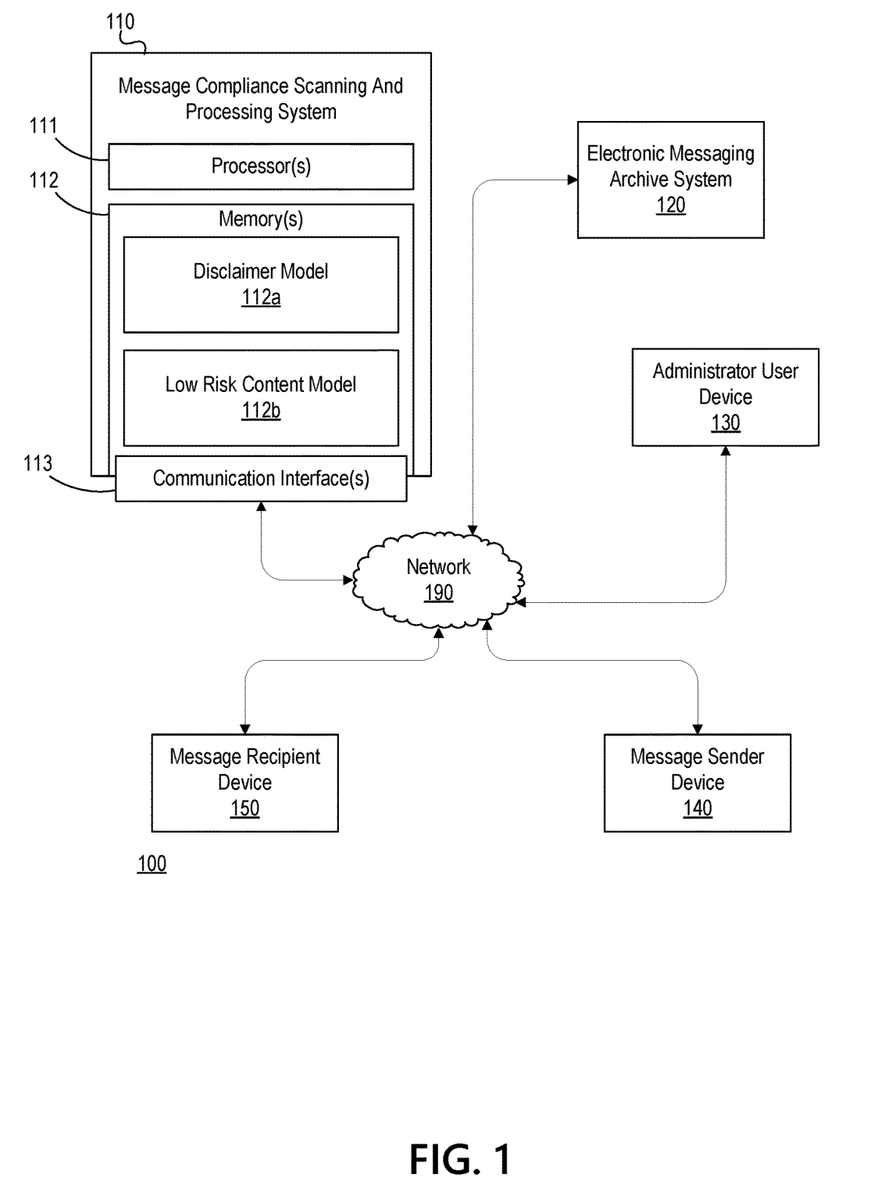
FIG. 1 depicts an illustrative operating environment for message compliance scanning and processing in accordance with one or more example embodiments.

FIG. 1 depicts an illustrative operating environment for message compliance scanning and processing in accordance with one or more example embodiments. Referring to FIG. 1, computing environment 100 may include various computer systems, computing devices, networks, and/or other operating infrastructure. For example, computing environment 100 may include a message compliance scanning and processing system 110, electronic messaging archive system 120, administrator user device 130, message sender device 140, message recipient device 150, and a network 190.

Network 190 may include one or more wired networks and/or one or more wireless networks that interconnect message compliance scanning and processing system 110, electronic messaging archive system 120, administrator user device 130, message sender device 140, message recipient device 150 and/or other computer systems and/or devices. In addition, each of message compliance scanning and processing system 110, electronic messaging archive system 120, administrator user device 130, message sender device 140, and/or message recipient device 150 may be special purpose computing devices configured to perform specific functions, as illustrated in greater detail below, and may include specific computing components such as processors, memories, communication interfaces, and/or the like.

Message compliance scanning and processing system 110 may include one or more processor(s) 111, one or more memory(s) 112, and one or more communication interface (s) 113. In some instances, message compliance scanning and processing system 110 may be made up of a plurality of different computing devices. In these instances, the one or more processor(s) 111, one or more memory(s) 112, and one or more communication interface(s) 113 included in message compliance scanning and processing system 110 may be part of and/or otherwise associated with the different computing devices that form message compliance scanning and processing system 110.

In one or more arrangements, processor(s) 111 may control operations of message compliance scanning and processing system 110. Memory(s) 112 may store instructions that, when executed by processor(s) 111, cause message compliance scanning and processing system 110 to perform one or more functions, as discussed below. Communication interface(s) 113 may include one or more wired and/or wireless network interfaces, and communication interface(s) 113 may connect message compliance scanning and processing system 110 to one or more networks (e.g., network 190) and/or message compliance scanning and processing system 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause message compliance scanning and processing system 110 to perform various functions) and/or databases (which may, e.g., store data used by message compliance scanning and processing system 110 in performing various functions). For example, memory(s) 112 may store and/or otherwise provide a disclaimer model 112*a* and a low risk content model 112*b*. In some instances, disclaimer model 112*a* may store instructions that cause message compliance scanning and processing system 110 to identify messages including disclaimer text, and filter these messages from further compliance screening accordingly. Additionally, low risk content model 112*b* may identify messages that include newsletters, automated notifications, and/or other content, and filter messages from further compliance screening accordingly. In some instances, these models may be and/or include machine learning engines, models, algorithms, or the like, which may store instructions and/or data that may cause and/or be used by message compliance scanning and processing system 110 to identify whether or not to filter messages from further compliance scanning, and/or execute one or more other functions described herein.

Electronic messaging archive system 120 may be or include one or more devices configured to archive and/or otherwise store historical electronic messages, and to route and/or otherwise facilitate the access of these messages by the message compliance scanning and processing system 110, and/or perform other functions. In some instances, the electronic messaging archive system 120 may be associated with an enterprise organization of the message compliance scanning and processing system 110. In some instances, actions described herein as being performed by the electronic messaging archive system 120 may, in some instances, be performed by a network gateway server without departing from the scope of the disclosure.

Administrator user device 130 may be configured to be used by an individual who may, e.g., be an employee or otherwise associated with an enterprise organization of the message compliance scanning and processing system 110. For example, the individual may use the administrator user device 130 to perform data labelling, model training, message compliance scanning, and/or other functions. In some instances, the administrator user device 130 may be one of a mobile device, smartphone, tablet, laptop computer, desktop computer, and/or other device configured for electronic messaging. In some instances, administrator user device 130 may be configured to present one or more user interfaces (e.g., data labelling interfaces, model training interfaces, message review interfaces, and/or other interfaces).

Message sender device 140 may be configured to be used by an individual who may, e.g., be either a legitimate individual (e.g., sending a compliant message) or a bad actor (e.g., sending a non-compliant message). For example, the individual may use the message sender device 140 to compose and/or otherwise send an electronic message. In some instances, the message sender device 140 may be one of a mobile device, smartphone, tablet, laptop computer, desktop computer, and/or other device configured for electronic messaging. In some instances, message sender device 140 may be configured to present one or more user interfaces (e.g., which may, e.g., enable the individual to create electronic messages, and/or otherwise provide user input).

Message recipient device 150 may be configured to be used by an individual who may, e.g., be an employee and/or customer associated with an enterprise organization affiliated with the message compliance scanning and processing system 110. For example, the individual may use the message recipient device 150 to receive or otherwise access an electronic message. In some instances, the message recipient device 150 may be one of a mobile device, smartphone, tablet, laptop computer, desktop computer, and/or other device configured for electronic messaging. In some instances, message recipient device 150 may be configured to present one or more user interfaces (e.g., which may, e.g., electronic messaging interfaces and/or other interfaces).

Figure 2A:
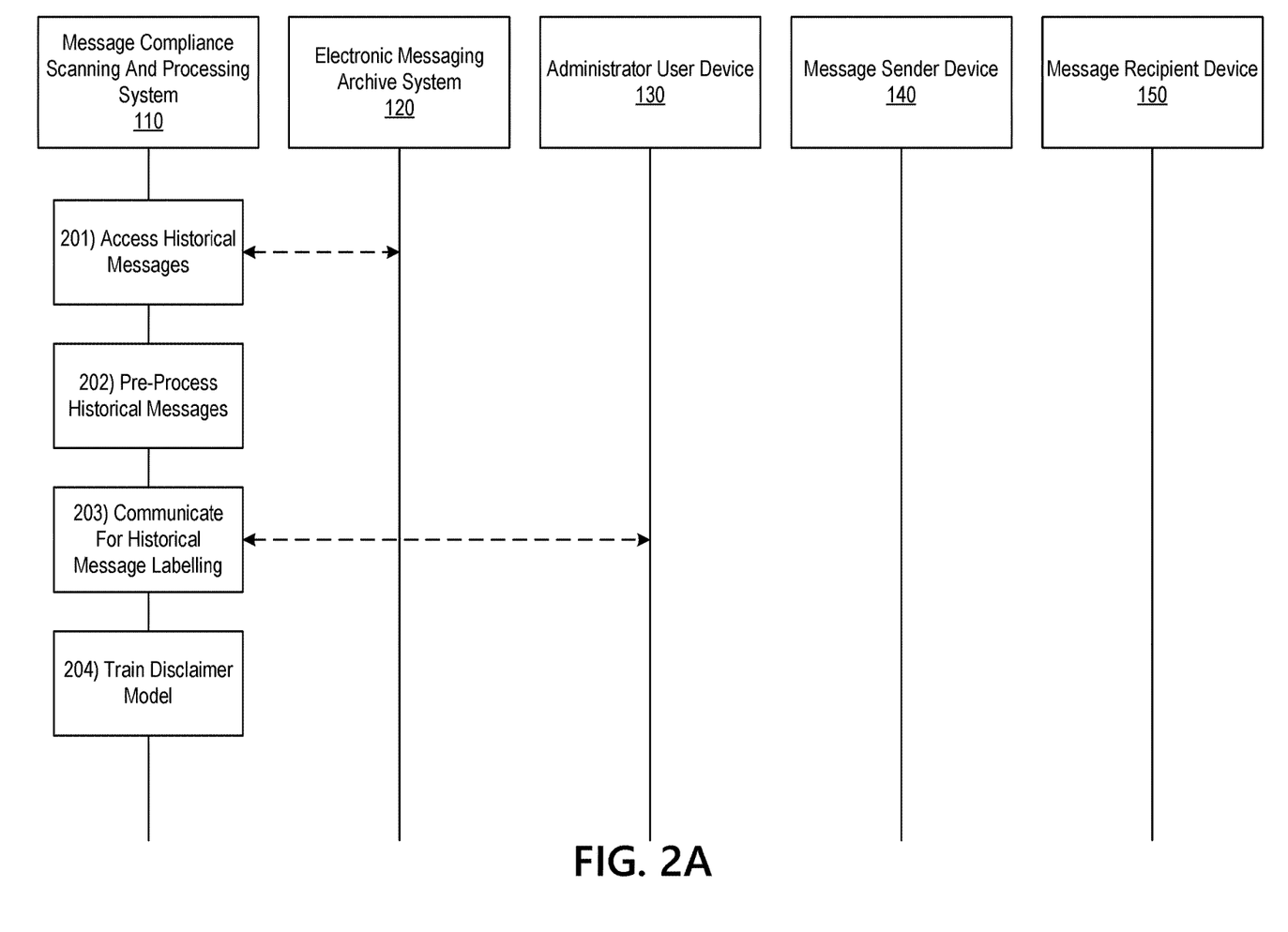
FIGS. 2A-2D depict an illustrative event sequence for message compliance scanning and processing in accordance with one or more example embodiments.

FIGS. 2A-2D depict an illustrative event sequence for message compliance scanning and processing in accordance with one or more example embodiments. Referring to FIG. 2A, at step 201, the message compliance scanning and processing system 110 may access historical electronic messages from the electronic messaging archive system 120. For example, the message compliance scanning and processing system 110 may obtain and/or otherwise access the electronic messaging archive system 120 while a wired or wireless data connection is established between the message compliance scanning and processing system 110, and via the communication interface 113. In some instances, in accessing the historical electronic messages, the message compliance scanning and processing system 110 may access email messages, chat messages, instant messages, text messages, and/or other electronic messages. In some instances, the message compliance scanning and processing system 110 may store the historical electronic messages once received (e.g., in an HTML and/or other format).

At step 202, the message compliance scanning and processing system 110 may pre-process the historical messages received at step 201. For example, the message compliance scanning and processing system 110 may configure the historical messages for input into the disclaimer model 112*a* and/or the low risk content model 112*b* for training. In some instances, the message compliance scanning and processing system 110 may configure a single set of training data, which may be used for input into both the disclaimer model 112*a* and the low risk content model 112*b*.

In other instances, the message compliance scanning and processing system 110 may configure a first set of training data for the disclaimer model 112*a* and a second set of training data for the low risk content model 112*b*. For example, in pre-processing the historical messages for use in training the disclaimer model 112*a*, the message compliance scanning and processing system 110 may extract plain text from the historical messages. The message compliance scanning and processing system 110 may also separate the plain text of each message into paragraphs. In contrast, in some instances, in pre-processing the historical messages for use in training the low risk content model 112*b*, the message compliance scanning and processing system 110 may extract the plain text from the historical messages, but might not separate the plain text into paragraphs.

At step 203, the message compliance scanning and processing system 110 may communicate with an administrator user device 130 to perform labelling of the pre-processed historical messages. For example, the message compliance scanning and processing system 110 may send the paragraphs of plain text for the disclaimer model 112a to the administrator user device 130, which may, e.g., present these paragraphs for display on a graphical user interface of the administrator user device 130. Additionally or alternatively, the message compliance scanning and processing system 110 may send the plain text for the low risk content model 112b to the administrator user device 130, which may, e.g., present this text for display on a graphical user interface of the administrator user device 130. In some instances, the administrator user device 130 may display an application programming interface (API), which may, e.g., include plain text and input fields enabling a user of the administrator user device 130 to label paragraphs and/or other plain text as corresponding to disclaimers, newsletters, automated notifications, and/or other content. In these instances, the administrator user device 130 may communicate with the message compliance scanning and processing system 110 to cause labelling information, input at the administrator user device 130, to be stored along with the corresponding pre-processed historical messages so as to generate a set of labelled training data. In some instances, this labelling may be performed based on one or more sets of labelling guidelines designed for identification of disclaimers, newsletters, automated notifications, and/or other content.

In some instances, in the initial round of labelling, random sampling may be used to select a random group of messages from the historical messages. As described further below at step 213, active learning may be used for message selection in further iterations of training and/or other refinement of the models.

Additionally or alternatively, this labelling may be automatically performed using one or more natural language processing (NLP), natural language understanding (NLU), and/or other techniques. In some instances, labelling information may be validated by a second round of manual and/or automated review. In some instances, a first set of labelled training data may be generated for use in training the disclaimer model 112a and a second set of labelled training data may be generated for use in training the low risk content model 112b. In other instances, a single set of labelled training data may be generated for use in training both models.

At step 204, the message compliance scanning and processing system 110 may train the disclaimer model 112a using the labelled dataset produced at step 204. For example, the message compliance scanning and processing system 110 may train a text classification model. In doing so, the message compliance scanning and processing system 110 may convert the labelled messaging information to numeric representations. For example, the message compliance scanning and processing system 110 may use pre-trained word embeddings to convert the labelled paragraphs to numeric representations. In some instances, the message compliance scanning and processing system 110 may train the disclaimer model 112a by providing labelled paragraph information indicating various paragraphs and whether or not the given paragraph was a disclaimer. Throughout the training process, the disclaimer model 112a may establish correlations between various paragraph information and whether or not it comprises a disclaimer, which may, e.g., configure the disclaimer model 112a to produce a probability that future messages include disclaimer text.

Once the disclaimer model 112a has been trained to a sufficient accuracy level, it may be deployed for message compliance scanning. In some instances, the disclaimer model 112a may measure accuracy by withholding a portion of the historical electronic messages from the pre-processing, labelling, and model training as described above. Once trained, the disclaimer model 112a may input these historical electronic messages into the disclaimer model 112a to produce a corresponding label, and may also submit these historical electronic messages for manual review. The outputs (e.g., label of disclaimer or no disclaimer) may be compared, and once an accuracy level of the disclaimer model 112a compared to the manual review reaches a predetermined threshold (e.g., 90% or other target level of accuracy), the disclaimer model 112a may be deployed. In some instances, this predetermined threshold may be based on sufficient levels of precision and recall, which may, e.g., be selected by an administrator and/or other enterprise user. In some instances, the predetermined threshold may be selected by clients on their own behalf (e.g., based on their personal risk tolerance or the like).

Use of this disclaimer model 112a may provide significant technical advantages. For example, disclaimers may often contain similar boilerplate language that may be fed into a model and used to train the model to identify such language. Similarly, such boilerplate language may be standard text included in variety of legitimate messages, but it may often trigger a compliance violation as a false positive. Accordingly, by training the disclaimer model 112a to identify such disclaimer text and remove the corresponding message from a pool of messages to which further message compliance scanning and/or other processing may be applied, various technical advantages may be realized. For example, the accuracy of such compliance scanning may be increased (e.g., by reducing false positives), processing power may be conserved (e.g., by avoiding further message analysis by removing the disclaimer messages), messaging efficiency may be increased (e.g., by reducing delays associated with further compliance analysis of such messages that include disclaimers), and/or other technical advantages may be realized.

Figure 2B:
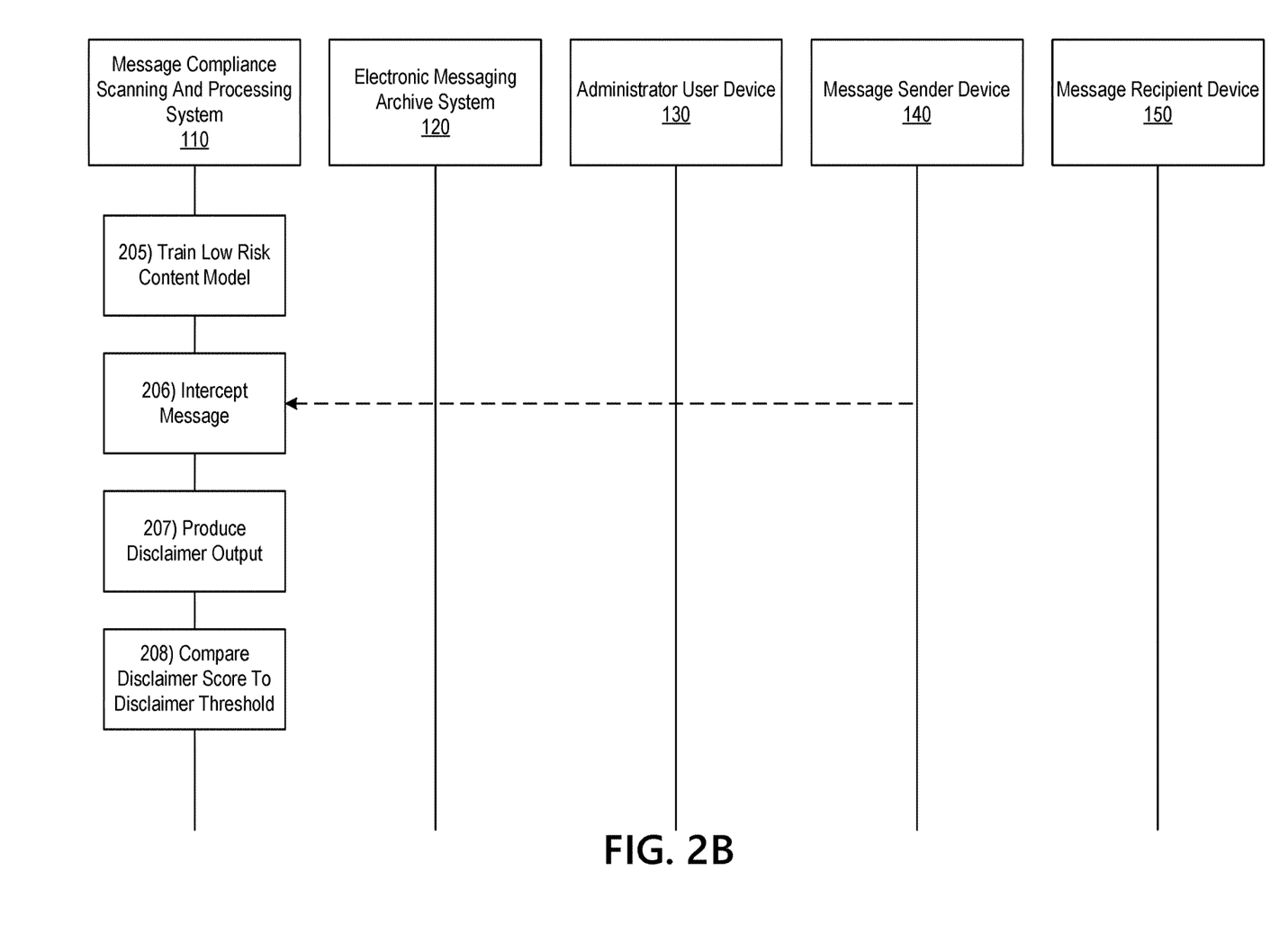

Referring to FIG. 2B, at step 205, the message compliance scanning and processing system 110 may train a low risk content model 112b using the labelled dataset produced at step 203. For example, the message compliance scanning and processing system 110 may train a text classification model. In doing so, the message compliance scanning and processing system 110 may convert the labelled messaging information to numeric representations. For example, the message compliance scanning and processing system 110 may use pre-trained word embeddings to convert the labelled messages to numeric representations. In some instances, the message compliance scanning and processing system 110 may train the low risk content model 112b by providing message information indicating various messages and whether or not the given message is a newsletter, automated notification, and/or other message type. Throughout the training process, the low risk content model 112b may establish correlations between various messages and the corresponding message types, which may, e.g., configure the low risk content model 112b to produce a probability that future messages comprise each of a newsletter, automated notification, and other message type. For example, for each message, the low risk content model 112b may produce a probability that the message is a newsletter, an automated notification, and another message type, where the three probabilities add up to one.

Once the low risk content model 112b has been trained to a sufficient accuracy level, it may be deployed for message compliance scanning. Similar to training of the disclaimer model above, in some instances, the low risk content model 112b may measure accuracy by withholding a portion of the historical electronic messages from the pre-processing, labelling, and model training as described above. Once trained, the low risk content model 112b may input these historical electronic messages into the low risk content model 112b to produce a corresponding label, and may also submit these historical electronic messages for manual review. The outputs (e.g., label of newsletter, automated notification, other message type) may be compared, and once an accuracy level of the low risk content model 112b compared to the manual review reaches a predetermined threshold (e.g., 90% or other target level of accuracy), the low risk content model 112b may be deployed. In some instances, this predetermined threshold may be based on sufficient levels of precision and recall, which may, e.g., be selected by an administrator and/or other enterprise user. In some instances, the predetermined threshold may be selected by clients on their own behalf (e.g., based on their personal risk tolerance or the like).

Figure 5:
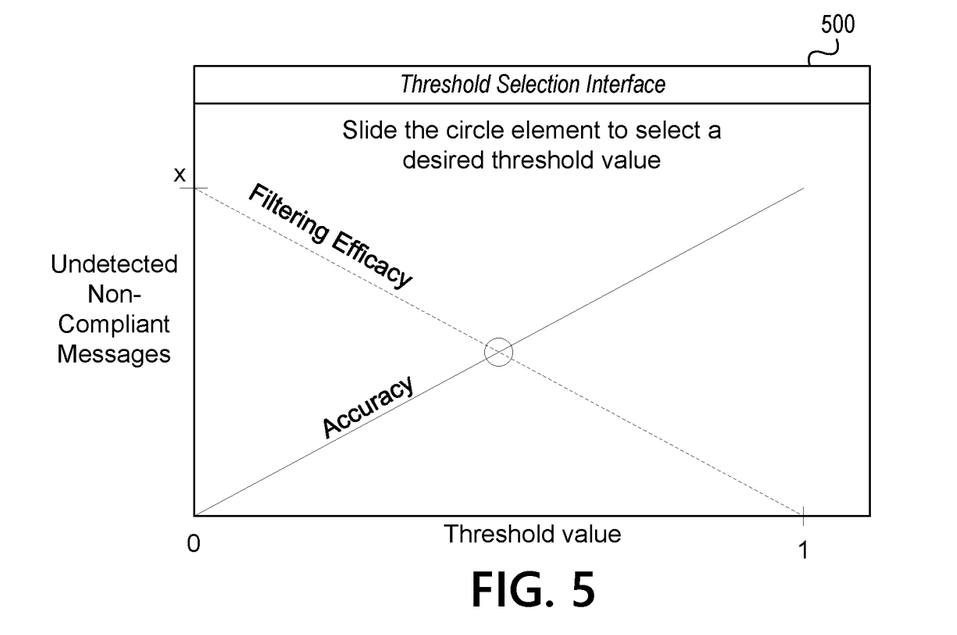

In some instances, the message compliance scanning and processing system 110 may communicate with the administrator user device 130 and/or the message recipient device 150 to cause display of a graphical user interface that may enable a user to select a customized threshold (e.g., so as to provide a customized tradeoff between accuracy and efficacy based on a given user's risk tolerance). For example, the more messages that are withdrawn from further compliance analysis, the more effective this tool may be considered to be (e.g., by filtering out an increased amount of messages to which further computing and/or manual resources must be applied). In contrast, the fewer messages that are withdrawn from further compliance analysis may result in higher accuracy of the tool (e.g., if no messages are withdrawn, then every single message would be analyzed using further computing and/or manual resources so as to ensure that no compliance violations slip through). It may be understood, however, that such analysis would involve the use of significant processing and/or manual resources for review. Accordingly, it may be important to identify a balance between efficacy and accuracy, which may be automatically selected and/or selected by a user. Referring back to the graphical user interface, the message compliance scanning and processing system 110 may cause the administrator user device 130 and/or the message recipient device 150 to display a graphical user interface similar to graphical user interface 500 of FIG. 5. In these instances, the graphical user interface may include a graphical representation of efficacy against accuracy as the threshold value is modified, and the user may be able to dynamically adjust the value of the threshold accordingly. In these instances, user input selecting a given threshold value may cause the threshold value to be updated accordingly. In some instances, this threshold value may be dynamically adjustable over time.

Similar to the above described disclaimer model 112a, use of this low risk content model 112b may provide significant technical advantages. For example, newsletters and/or automated notifications may often contain similar boilerplate language that may be fed into a model and used to train the model to identify such language. Similarly, such boilerplate language may be standard text included in variety of legitimate messages, but it may often trigger a compliance violation as a false positive. Accordingly, by training the low risk content model 112b to identify such newsletters and automated notifications, and removing them from a pool of messages to which further message compliance scanning and/or other processing may be applied, advantages may be realized. For example, the accuracy of such compliance scanning may be increased (e.g., by reducing false positives), processing power may be conserved (e.g., by avoiding further message analysis by removing the newsletters and automated notifications), messaging efficiency may be increased (e.g., by reducing delays associated with further compliance analysis of such messages that are newsletters or automated notifications), and/or other technical advantages may be realized.

Although training of both the disclaimer model 112a and the low risk content model 112b are described, in some instances, either of the disclaimer model 112a and the low risk content model 112b may be independently deployed and/or deployed in combination with other models without departing from the scope of the disclosure. In some instances, training of the disclaimer model 112a and/or the low risk content model 112b may be performed by enterprise employees and/or customers themselves.

At step 206, the message compliance scanning and processing system 110 may intercept a message from the message sender device 140. For example, the message compliance scanning and processing system 110 may intercept a message intended for the message recipient device 150. In some instances, the message compliance scanning and processing system 110 may intercept email messages, chat messages, instant messages, text messages, and/or other electronic messages. In some instances, the message compliance scanning and processing system 110 may intercept the message while a wired or wireless connection is established with the message sender device 140 and via the communication interface 113.

At step 207, the message compliance scanning and processing system 110 may feed the message, intercepted at step 207, into the disclaimer model 112a to produce a disclaimer output for the message. For example, the message compliance scanning and processing system 110 may pre-process the message as described above at step 202 with regard to the historical messages so as to format the message for analysis by the disclaimer model 112a (e.g., extracting plain text, segmenting paragraphs, converting to a numeric representation, and/or other functions). Once pre-processing is complete, the message may be fed into the disclaimer model 112a for comparison to the historical messages, labelled as including a disclaimer or not including a disclaimer. Based on this comparison, the disclaimer model 112a may produce a binary output of "yes" (indicating that the message does include a disclaimer) or "no" (indicating that the message does not include a disclaimer).

Additionally or alternatively, the disclaimer model 112a may produce a disclaimer score indicating a probability that the message includes a disclaimer. In some instances, the probability may comprise a binary probability of 0 or 1, 0 indicating that the message does not include a disclaimer and 1 indicating that the message does include a disclaimer. In other instances, the probability may comprise any value between 0 and 1 (inclusive).

In instances where a disclaimer score is produced, the message compliance scanning and processing system 110 may proceed to step 208. Otherwise, if a binary disclaimer output is produced, the message compliance scanning and processing system 110 may skip step 208 and proceed to step 209.

At step 208, the message compliance scanning and processing system 110 may compare the disclaimer score, produced at step 207, to a disclaimer threshold (e.g., defining a probability at which a message is deemed to include a disclaimer). For example, the message compliance scanning and processing system 110 may compare the disclaimer score to a disclaimer threshold of 0.5 and/or other value. If the disclaimer score meets or exceeds the disclaimer threshold, the message compliance scanning and processing system 110 may identify that the message includes a disclaimer. Otherwise, if the disclaimer score does not meet or exceed the disclaimer threshold, the message compliance scanning and processing system 110 may identify that the message does not include a disclaimer.

Figure 2C:
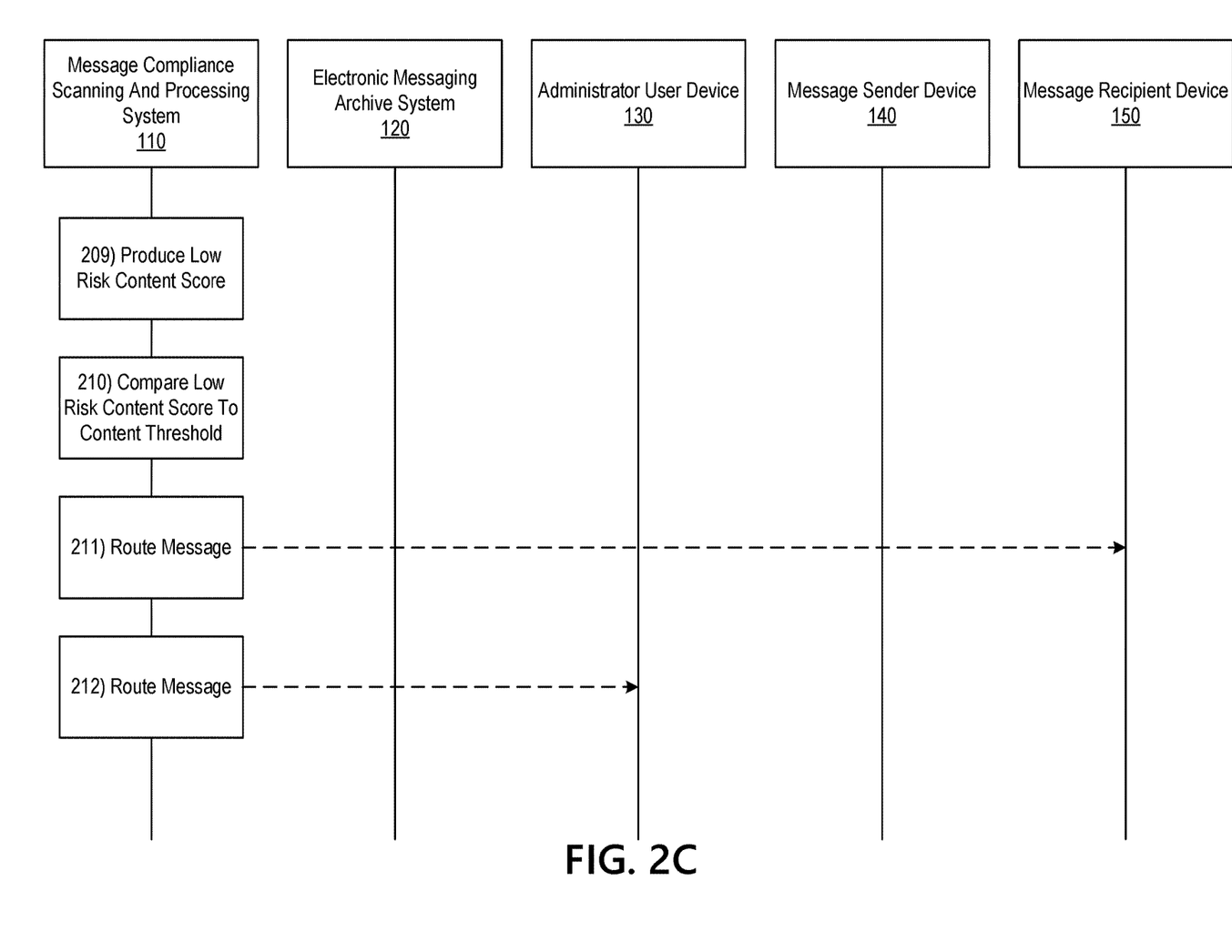

Referring to FIG. 2C, at step 209, the message compliance scanning and processing system 110 may feed the message, intercepted at step 207, into the low risk content model 112b to produce one or more content scores for the message. For example, the message compliance scanning and processing system 110 may pre-process the message as described above at step 202 with regard to the historical messages so as to format the message for analysis by the low risk content model 112b (e.g., extracting plain text, converting to a numeric representation, and/or other functions). Once pre-processing is complete, the message may be fed into the low risk content model 112b for comparison to the historical messages, labelled based on their content type (e.g., newsletter, automated notification, and/or other content). Based on this comparison, the low risk content model 112b may produce content scores indicating a probability that the message corresponds to each of these content types. In some instances, the probabilities may be, for example, newsletter score=0, automated notification score=0, other content score=1 (e.g., indicating that the message comprises other content). In other instances, the probabilities may identify uncertainty in the message type (e.g., newsletter score=0.33, automated notification score=0.33, and other content score=0.33). In any instances, the various content scores may add up to one, and may be any value between 0 and 1 (inclusive).

At step 210, the message compliance scanning and processing system 110 may compare the content scores, produced at step 209, to a content threshold (e.g., defining a probability at which a message is deemed to correspond to an identified content type). For example, the message compliance scanning and processing system 110 may compare the various content scores to a content threshold of 0.5 and/or other value. In some instances, this content threshold may be selected via a graphical user interface similar to graphical user interface 500 of FIG. 5, which may enable employees and/or customers to select a customized threshold value based on their personal risk tolerance (e.g., as is described further above with regard to training the low risk content model 112b). If any content score meets or exceeds the content threshold, the message compliance scanning and processing system 110 may identify that the message corresponds to that respective content type. For example, if the newsletter score is 0.6, the message compliance scanning and processing system 110 may identify that the message is a newsletter. Otherwise, if the none of the content scores meet or exceed the content, the message compliance scanning and processing system 110 may identify that the content type of the message is uncertain.

If the disclaimer model 112a identifies that the message includes a disclaimer and/or the low risk content model identifies that the message is a newsletter or automated notification, the message compliance scanning and processing system 110 may proceed to step 211. Otherwise, if the disclaimer model 112a identifies that the message does not include a disclaimer and the low risk content model identifies that the message corresponds to another message type (and/or the message type is uncertain), the message compliance scanning and processing system 110 may proceed to step 212. Although analysis by both the disclaimer model 112a and the low risk content model 112b are described above, analysis may be performed by a single one of the models (alone or in combination with other models) and/or applied in a sequence different than the illustrative sequence illustrated herein without departing from the scope of the disclosure.

At step 211, based on the identification that the message includes a disclaimer and/or is one of a newsletter or automated notification, the message compliance scanning and processing system 110 may route the message to the intended recipient (e.g., the message recipient device 150). For example, the message compliance scanning and processing system 110 may route the message to the message recipient device 150 via the communication interface 113 and while a wired or wireless data connection is established with the message recipient device 150. In some instances, the message compliance scanning and processing system 110 may also send one or more commands directing the message recipient device 150 to display the message (which may, e.g., cause the message recipient device 150 to display the message).

In some instances, the message compliance scanning and processing system 110 may automatically route the message to the intended recipient. In other instances, the disclaimer and/or low risk content models may be suggestion models, which may, e.g., provide a suggested classification of the message (e.g., to the enterprise user device 130) and prompt for validation prior to sending the message.

Figure 4:
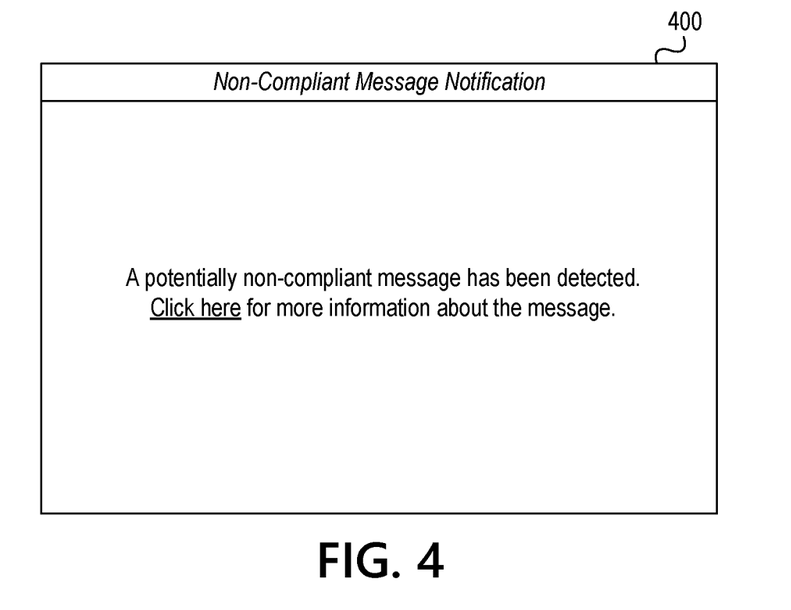
FIGS. 4 and 5 depict illustrative user interfaces for message compliance scanning and processing in accordance with one or more example embodiments.

Returning to step 210, if the message compliance scanning and processing system 110 identified that the message does not include a disclaimer and has a different message content type (and/or the message type is uncertain), the message compliance scanning and processing system 110 may proceed to step 212. At step 212, the message compliance scanning and processing system 110 may route the message to the administrator user device 130 for further analysis. For example, the message compliance scanning and processing system 110 may route the message to the administrator user device 130. In some instances, the message compliance scanning and processing system 110 may also send one or more commands directing the administrator user device 130 to display a non-compliant messaging interface (e.g., similar to graphical user interface 400 of FIG. 4). In these instances, selection of a user interface element such as a "click here" link and/or other element may cause the message to be moved into a backend queue for further compliance analysis, initiate an automated compliance analysis of the message, cause display of the message, and/or initiate other compliance analysis actions. In some instances, the interface may provide options for the user to initiate (and/or may otherwise cause automated initiation of) additional security actions for the message (e.g., route the message to a secure sandbox, quarantine the message, add the sender to a blacklist, and/or perform other security actions).

Figure 2D:
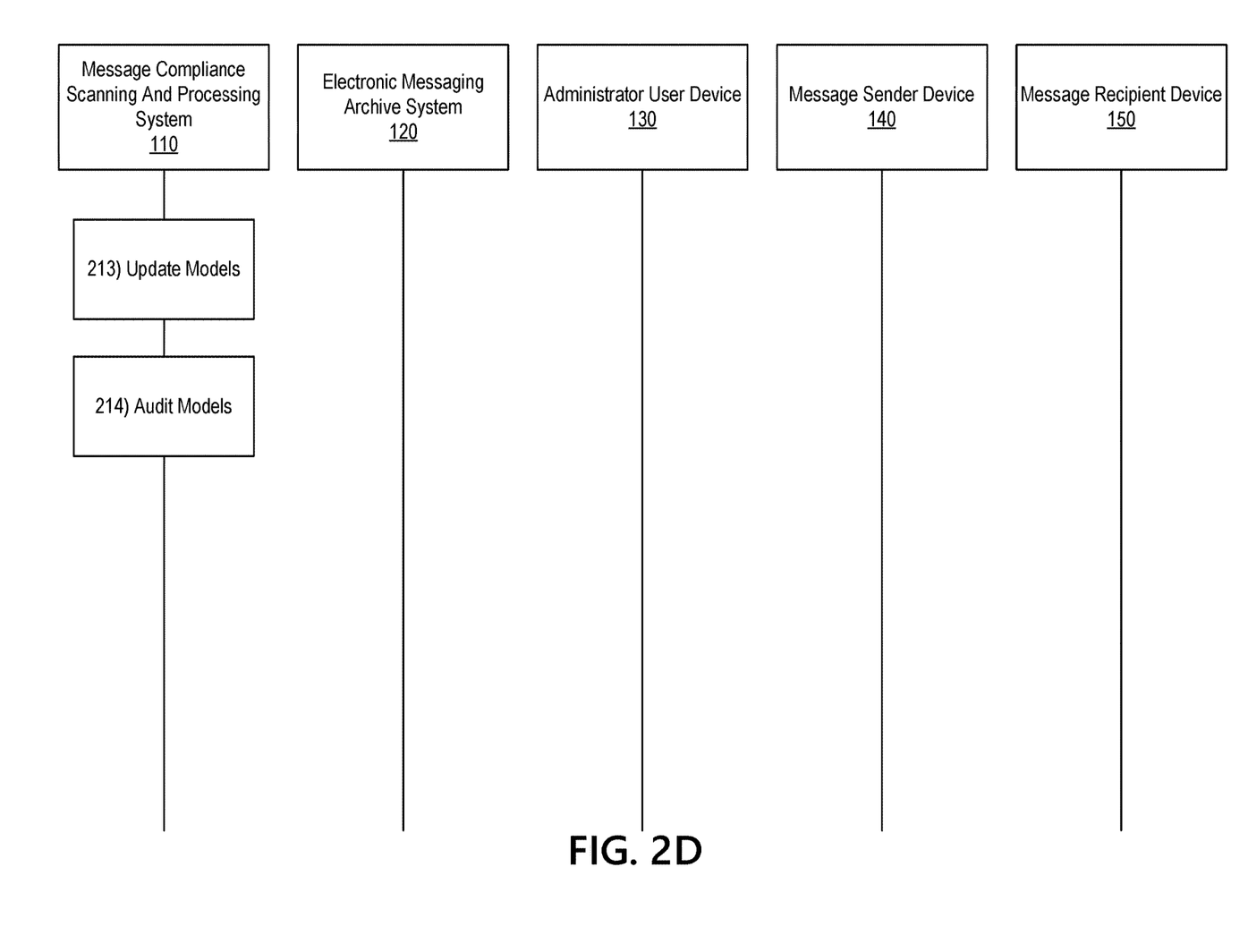

Referring to FIG. 2D, at step 213, the message compliance scanning and processing system 110 may update the disclaimer model 112*a* and/or the low risk content model 112*b*. For example, in the event that a predetermined amount of negative feedback is received (e.g., from clients, employees, or the like), the message compliance scanning and processing system 110 may retrain the disclaimer model 112*a* and/or the low risk content model 112*b* by repeating steps similar to those described above with regard to initial training of the models. However, in retraining the models, an updated set of historical messages may be used (e.g., the historical messages described at step 201 in addition to additional historical messages, received during the period of time between initial training of the models and the updated training). In doing so, accuracy of the disclaimer model 112*a* and/or low risk content model 112*b* may be refined and improved as needed.

In some instances, in selecting messages for pre-processing, labelling, and training, the message compliance scanning and processing system 110 may perform active learning (e.g., as opposed to the random sampling described in the initial model training above). For example, the message compliance scanning and processing system 110 may select difficult messages to score and/or otherwise classify, and may label these messages to further improve performance of the models. For example, if the low risk content model produced equivalent content scores for newsletter, automated notification, and other message type for a given message, this may indicate that the message was difficult for the model to score. Accordingly, this message may be selected for training, manually labelled, and fed back into the model so as to improve model performance.

In some instances, in updating the disclaimer model 112*a* and/or the low risk content model 112*b* may include generating a shadow version of one or more of the models, which may be an offline update to the disclaimer model 112*a* and/or the low risk content model 112*b*. In these instances, the previously deployed versions of the models may remain deployed and in use, while the shadow version is subjected to offline testing. For example, the shadow version of the model(s) may be trained using methods similar to those described above with regard to the initial and/or updated model training. Once trained, results of the shadow version may be compared to the results of the deployed models. Based on identifying that the shadow version has better performance than the deployed models, the deployed models may be taken offline and replaced by the shadow version. In contrast, if the shadow version has worst performance, the original models may remain deployed, and further training and/or refinement may be performed with regard to the shadow version.

In some instances, the models may be periodically updated. Additionally or alternatively, the models may be updated based on an audit of one or more of the models (e.g., an audit as described below at step 214).

At step 214, the message compliance scanning and processing system 110 may audit the disclaimer model 112*a* and/or the low risk content model 112*b*. For example, the disclaimer model 112*a* and/or the low risk content model 112*b* may be audited to verify that accuracy of one or more of these models meets an accuracy threshold. In some instances, to do so, one or more messages (e.g., historical messages and/or newly received messages) may have been withheld and/or otherwise not used in initially training and/or otherwise updating the models. Based on identifying that disclaimer model 112*a* and/or low risk content model 112*b* should be audited (e.g., based on an input from the administrator user device 130 and/or otherwise), the message compliance scanning and processing system 110 may input these withheld messages into a given model as well as route the messages for manually review. The results of the given model may be compared to the manual review results (which may, e.g., be used as a source of truth for comparison). If the results match in at least a predetermined percentage (e.g., corresponding to an accuracy threshold), the audited model may remain in use. Otherwise, the audited model may be removed from use and further trained until the accuracy is increased. Although this auditing is described with regard to step 214, such auditing may be performed at anytime throughout the event sequence without departing from the scope of the disclosure, such as once a model has already been deployed, before a model has been deployed (e.g., during initial training), before a model update has been deployed (e.g., a shadow version update to a model), and/or otherwise.

Figure 3:
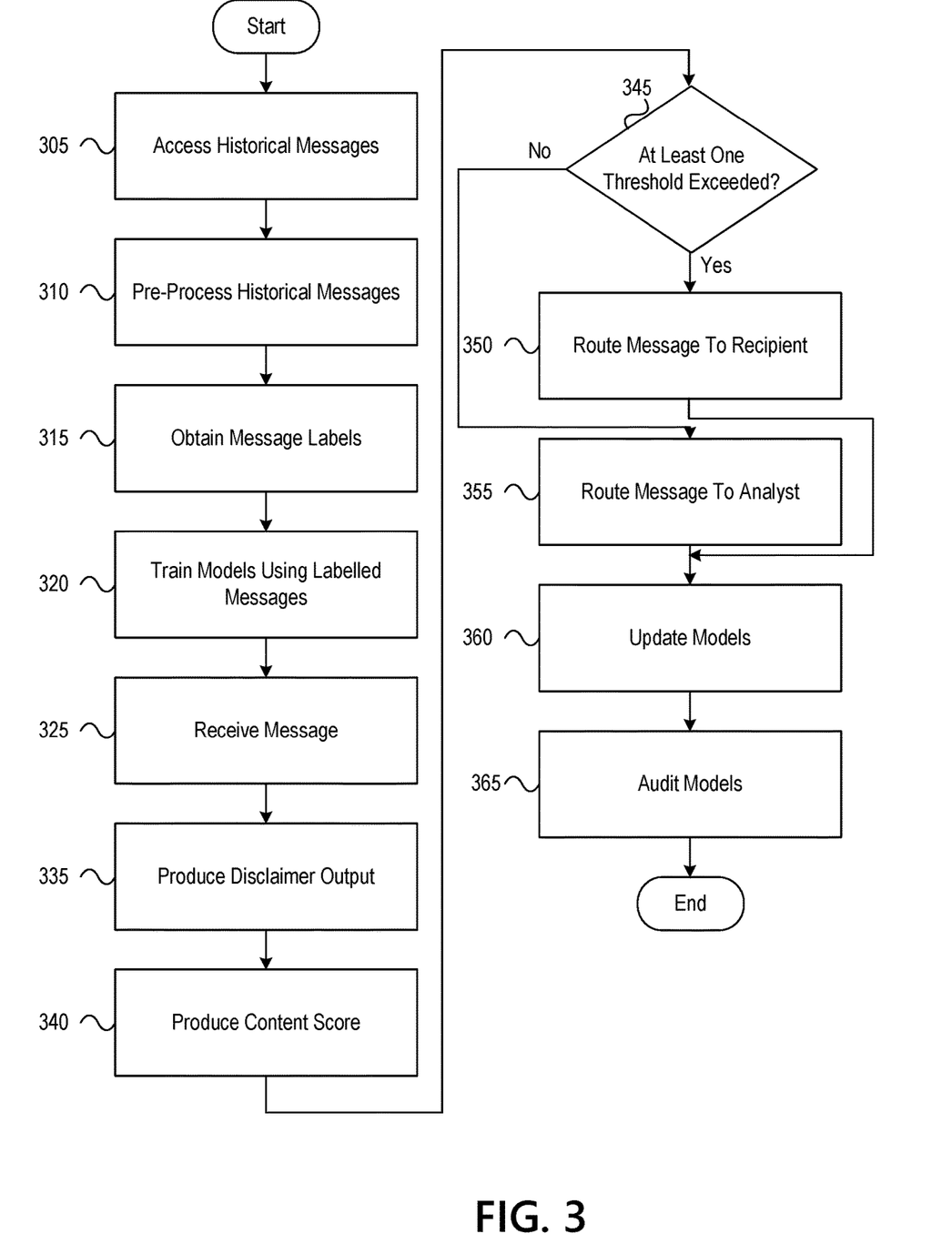
FIG. 3 depicts an illustrative method for message compliance scanning and processing in accordance with one or more example embodiments.

FIG. 3 depicts an illustrative method for message compliance scanning and processing in accordance with one or more example embodiments. Referring to FIG. 3, at step 305, a computing platform having at least one processor, a communication interface, and memory may access historical messages. At step 310, the computing platform may pre-process the historical messages. At step 315, the computing platform may label the pre-processed historical messages. At step 320, the computing platform may train a disclaimer model and/or low risk content model using the labelled messages. At step 325, the computing platform may receive a new message. At step 335, the computing platform may input the new message into the disclaimer model to produce a disclaimer output. At step 340, the computing platform may input the new message into the low risk content model to produce one or more content scores. At step 345, the computing platform may identify whether or not the new message included a disclaimer and/or one or more content scores meet or exceed a corresponding message compliance threshold. If the new message does include a disclaimer and/or if one or more of the scores do exceed a corresponding message compliance threshold, the computing platform may proceed to step 350.

At step 350, the computing platform may route the new message to an intended recipient. Returning to step 345, if the new message does not include a disclaimer and one or more of the scores do not meet or exceed the corresponding message compliance threshold, the computing platform may proceed to step 355. At step 355, the computing platform may route the new message to an analyst for further compliance analysis. At step 360, the computing platform may update the disclaimer and/or low risk content models. At step 365, the computing platform may audit the disclaimer and/or low risk content models It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   access historical messages;
   pre-process the historical messages to configure the historical messages for use in training a disclaimer model to identify whether or not input messages include a disclaimer;
   train, using the pre-processed historical messages, the disclaimer model;
   receive a new message;
   input, into the disclaimer model, the new message, wherein the disclaimer model produces a disclaimer output indicating whether or not the new message includes a disclaimer;
   input, into a low risk content model, the new message, wherein the low risk content model produces:
     a newsletter score indicating a likelihood that the new message comprises a newsletter,
     an automated notification score indicating a likelihood that the new message comprises an automated notification, and
     an other message score indicating a likelihood that the new message comprises another type of message, wherein a sum of the newsletter score, the automated notification score, and the other message score comprises one;
   based on identifying one or more of: that the new message does include a disclaimer, the newsletter score exceeds a content threshold, or that the automated notification score exceeds the content threshold:
     remove, from a set of messages scheduled for compliance review, the new message, and
     send, to an intended recipient of the new message, the new message; and
   based on identifying that the new message does not include a disclaimer, that the newsletter score fails to exceed the content threshold, and that the automated notification score fails to exceed the content threshold, send one or more commands directing an administrator device to display a non-compliant messaging interface including a user interface element, wherein selection of the user interface element causes one or more of:
     the new message to be moved into a backend queue for further compliance analysis,
     the new message to be routed to a secure sandbox,
     the new message to be quarantined, or
     a sender of the new message to be added to a blacklist.

2. The computing platform of claim 1, wherein the pre-processing includes:
   extracting, from the historical messages, plain text;
   separating the plain text into paragraphs;
   receiving message label information indicating whether or not each of the paragraphs include a disclaimer;
   labeling the paragraphs based on the message label information; and
   converting the paragraphs into numeric representations configured for input into the disclaimer model.

3. The computing platform of claim 1, wherein the disclaimer model comprises a text classification model.

4. The computing platform of claim 1, wherein producing the disclaimer output includes:
producing a disclaimer score indicating a likelihood that the new message includes a disclaimer, wherein the disclaimer score is a value between zero and one, wherein a disclaimer score of zero indicates that the new message definitely does not include a disclaimer, and wherein a disclaimer score of one indicates that the new message definitely includes a disclaimer; and
comparing the disclaimer score to a disclaimer threshold, wherein identifying that the new message does include a disclaimer is based on identifying that the disclaimer score meets or exceeds the disclaimer threshold.

5. The computing platform of claim 1, based on identifying that new message does not include a disclaimer:
routing the new message for one or more of: automated or manual message compliance review.

6. The computing platform of claim 1, wherein training the disclaimer model includes:
receiving a target level of accuracy for the disclaimer model, wherein the target level of accuracy comprises one or more of: a target level of recall or a target level of precision;
identifying a level of accuracy for the disclaimer model;
comparing the level of accuracy to the target level of accuracy;
based on identifying that the level of accuracy is equal to or greater than the target level of accuracy, deploying the disclaimer model; and
based on identifying that the level of accuracy is less than the target level of accuracy, continuing to train the disclaimer model.

7. The computing platform of claim 1, wherein the memory stores additional computer-readable instructions that, when executed by the at least one processor, further cause the computing platform to:
train, using the pre-processed historical messages, the low risk content model, wherein the low risk content model is configured to identify a likelihood that the input messages comprise one of: a newsletter, an automated notification, or a different message.

8. The computing platform of claim 1, wherein the content threshold is specified at a user device via selection on a graphical user interface that includes a relationship between accuracy and filtering efficacy of the low risk content model as the content threshold is adjusted.

9. The computing platform of claim 7, wherein the memory stores additional computer-readable instructions that, when executed by the at least one processor, further cause the computing platform to:
audit the low risk content model to verify that accuracy of the low risk content model meets or exceeds an accuracy threshold, wherein auditing the low risk content model comprises:
withholding a subset of the pre-processed historical messages from use in training the low risk content model; and
upon identifying that the low risk content model should be audited:
inputting the subset of the pre-processed historical messages into the low risk content model,
routing the subset of the pre-processed historical messages for manual review,
comparing results of the low risk content model analysis and the manual review,
based on identifying that the comparison indicates accuracy that meets or exceeds the accuracy threshold, continuing to operate the low risk content model, and
based on identifying that the comparison indicates the accuracy does not meet or exceed the accuracy threshold, continuing to train the low risk content model.

10. A method, comprising:
at a computing platform comprising at least one processor, a communication interface, and memory:
accessing historical messages;
pre-processing the historical messages to configure the historical messages for use in training a disclaimer model to identify whether or not input messages include a disclaimer;
training, using the pre-processed historical messages, the disclaimer model;
receiving a new message;
inputting, into the disclaimer model, the new message, wherein the disclaimer model produces a disclaimer output indicating whether or not the new message includes a disclaimer;
inputting, into a low risk content model, the new message, wherein the low risk content model produces:
a newsletter score indicating a likelihood that the new message comprises a newsletter,
an automated notification score indicating a likelihood that the new message comprises an automated notification, and
an other message score indicating a likelihood that the new message comprises another type of message, wherein a sum of the newsletter score, the automated notification score, and the other message score comprises one; and
based on identifying one or more of: that the new message does include a disclaimer, the newsletter score exceeds a content threshold, or that the automated notification score exceeds the content threshold:
removing, from a set of messages scheduled for compliance review, the new message, and
sending, to an intended recipient of the new message, the new message; and
based on identifying that the new message does not include a disclaimer, that the newsletter score fails to exceed the content threshold, and that the automated notification score fails to exceed the content threshold, sending one or more commands directing an administrator device to display a non-compliant messaging interface including a user interface element, wherein selection of the user interface element causes one or more of:
the new message to be moved into a backend queue for further compliance analysis,
the new message to be routed to a secure sandbox,
the new message to be quarantined, or
a sender of the new message to be added to a blacklist.

11. The method of claim 10, wherein the pre-processing includes:
extracting, from the historical messages, plain text;
separating the plain text into paragraphs;
receiving message label information indicating whether or not each of the paragraphs include a disclaimer;

labeling the paragraphs based on the message label information; and converting the paragraphs into numeric representations configured for input into the disclaimer model.

12. The method of claim 10, wherein the disclaimer model comprises a text classification model.

13. The method of claim 10, wherein producing the disclaimer output includes:

producing a disclaimer score indicating a likelihood that the new message includes a disclaimer, wherein the disclaimer score is a value between zero and one, wherein a disclaimer score of zero indicates that the new message definitely does not include a disclaimer, and wherein a disclaimer score of one indicates that the new message definitely includes a disclaimer; and comparing the disclaimer score to a disclaimer threshold, wherein identifying that the new message does include a disclaimer is based on identifying that the disclaimer score meets or exceeds the disclaimer threshold.

14. The method of claim 10, based on identifying that the new message does not include a disclaimer:

routing the new message for one or more of: automated or manual message compliance review.

15. The method of claim 10, wherein training the disclaimer model includes:

receiving a target level of accuracy for the disclaimer model, wherein the target level of accuracy comprises one or more of: a target level of recall or a target level of precision;

identifying a level of accuracy for the disclaimer model;

comparing the level of accuracy to the target level of accuracy;

based on identifying that the level of accuracy is equal to or greater than the target level of accuracy, deploying the disclaimer model; and based on identifying that the level of accuracy is less than the target level of accuracy, continuing to train the disclaimer model.

16. The method of claim 10, wherein the memory stores additional computer-readable instructions that, when executed by the at least one processor, further cause the computing platform to:

train, using the pre-processed historical messages, the low risk content model, wherein the low risk content model is configured to identify a likelihood that the input messages comprise one of: a newsletter, an automated notification, or a different message.

17. One or more non-transitory computer-readable media storing instructions that, when executed by a computing platform comprising at least one processor, a communication interface, and memory, cause the computing platform to:

access historical messages;

pre-process the historical messages to configure the historical messages for use in training a disclaimer model to identify whether or not input messages include a disclaimer;

train, using the pre-processed historical messages, the disclaimer model;

receive a new message;

input, into the disclaimer model, the new message, wherein the disclaimer model produces a disclaimer output indicating whether or not the new message includes a disclaimer;

input, into a low risk content model, the new message, wherein the low risk content model produces:

a newsletter score indicating a likelihood that the new message comprises a newsletter, an automated notification score indicating a likelihood that the new message comprises an automated notification, and an other message score indicating a likelihood that the new message comprises another type of message, wherein a sum of the newsletter score, the automated notification score, and the other message score comprises one; and based on identifying one or more of: that the new message does include a disclaimer, the newsletter score exceeds a content threshold, or that the automated notification score exceeds the content threshold:

remove, from a set of messages scheduled for compliance review, the new message, and send, to an intended recipient of the new message, the new message; and based on identifying that the new message does not include a disclaimer, that the newsletter score fails to exceed the content threshold, and that the automated notification score fails to exceed the content threshold, send one or more commands directing an administrator device to display a non-compliant messaging interface including a user interface element, wherein selection of the user interface element causes one or more of:

the new message to be moved into a backend queue for further compliance analysis, the new message to be routed to a secure sandbox, the new message to be quarantined, or a sender of the new message to be added to a blacklist.

* * * * *